United States Patent
Deutschle et al.

(10) Patent No.: US 9,697,135 B2
(45) Date of Patent: *Jul. 4, 2017

(54) SUPPRESSING VIRTUAL ADDRESS TRANSLATION UTILIZING BITS AND INSTRUCTION TAGGING

(71) Applicant: International Business Machines Corporation, Armonk, NY (US)

(72) Inventors: Joerg Deutschle, Winnenden (DE); Ute Gaertner, Schoenaich (DE); Lisa C. Heller, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,585

(22) Filed: May 3, 2016

(65) Prior Publication Data
US 2016/0321186 A1 Nov. 3, 2016

Related U.S. Application Data

(63) Continuation of application No. 13/667,671, filed on Nov. 2, 2012, now Pat. No. 9,330,017.

(51) Int. Cl.
G06F 12/1009 (2016.01)
G06F 12/1027 (2016.01)

(52) U.S. Cl.
CPC ...... *G06F 12/1009* (2013.01); *G06F 12/1027* (2013.01); *G06F 2212/682* (2013.01)

(58) Field of Classification Search
None
See application file for complete search history.

(56) References Cited

U.S. PATENT DOCUMENTS 3,947,823 A * 3/1976 Padegs .................. G06F 12/145
711/202
4,373,179 A 2/1983 Katsumata
(Continued)

FOREIGN PATENT DOCUMENTS

EP 1914627 A2 4/2008

OTHER PUBLICATIONS

Sinharoy, et al., "IBM POWER7 Multicore Server Processor", vol. 55 No. 3 Paper 1, May-Jun. 2011, 29 pages.
(Continued)

*Primary Examiner* — Midys Rojas
*Assistant Examiner* — Chie Yew
(74) *Attorney, Agent, or Firm* — DeLizio Law, PLLC

(57) ABSTRACT

A translation lookaside buffer coherency unit with Emulated Purge (TCUEP) translates a first virtual address for a first instruction into a first physical address. The TCUEP detects a multi-processor coherency operation that will cause hit suppression for certain entries in a TLB and purging of certain entries in the TLB. The TCUEP translates a second virtual address for a second instruction into a second physical address and stores the second physical address in a second entry in the TLB. The TCUEP configures a second marker in the second entry to indicate that the hit suppression is not allowed for the second entry, and that the purging is not allowed for the second entry. The TCUEP receives a first address translation request that indicates a hit in the second entry. The TCUEP resolves the first address translation request by returning the second physical address.

18 Claims, 6 Drawing Sheets

(56) References Cited

U.S. PATENT DOCUMENTS

| | | | |
|---|---|---|---|
| 4,731,739 A | | 3/1988 | Woffinden et al. |
| 5,564,111 A | * | 10/1996 | Glew .................... G06F 9/3842 711/202 |
| 5,613,083 A | | 3/1997 | Glew et al. |
| 5,758,120 A | * | 5/1998 | Kahle ................ G06F 12/1027 711/144 |
| 6,105,113 A | | 8/2000 | Schimmel |
| 6,119,204 A | | 9/2000 | Chang et al. |
| 6,289,442 B1 | | 9/2001 | Asato |
| 7,761,696 B1 | | 7/2010 | Bhattacharyya et al. |
| 8,433,855 B2 | | 4/2013 | Alexander et al. |
| 8,607,008 B1 | * | 12/2013 | Glasco ................ G06F 12/1009 711/147 |
| 2004/0215898 A1 | | 10/2004 | Arimilli et al. |
| 2004/0230768 A1 | | 11/2004 | Slegel et al. |
| 2005/0154835 A1 | | 7/2005 | Steely, Jr. et al. |
| 2006/0026382 A1 | | 2/2006 | Hirano et al. |
| 2006/0095674 A1 | | 5/2006 | Twomey et al. |
| 2007/0005932 A1 | | 1/2007 | Covelli et al. |
| 2008/0163220 A1 | | 7/2008 | Wang et al. |
| 2009/0182893 A1 | | 7/2009 | Anand et al. |
| 2009/0217264 A1 | | 8/2009 | Heller et al. |
| 2010/0250895 A1 | | 9/2010 | Adams et al. |
| 2011/0145542 A1 | | 6/2011 | Morrow et al. |
| 2011/0145546 A1 | | 6/2011 | Woffinden |
| 2011/0208944 A1 | | 8/2011 | Champagne et al. |

OTHER PUBLICATIONS

"U.S. Appl. No. 13/667,671 Final Office Action", Sep. 25, 2015, 54 pages.
"U.S. Appl. No. 13/667,671 Office Action", Jul. 30, 2014, 24 pages.
"U.S. Appl. No. 13/667,671 Office Action", May 8, 2015, 55 Pages.
"U.S. Appl. No. 13/667,687 Office Action", Aug. 27, 2014, 17 pages.
"U.S. Appl. No. 13/667,671 Final Office Action", Dec. 26, 2014, 50 pages.
"U.S. Appl. No. 13/7667,687 Final Office Action", Dec. 22, 2014, 16 pages.
"U.S. Appl. No. 13/773,230 Office Action", Nov. 5, 2014, 11 pages.
"U.S. Appl. No. 13/776,842 Final Office Action", Sep. 25, 2015, 27 pages.
"U.S. Appl. No. 13/776,842 Final Office Action", Dec. 22, 2014, 30 pages.
"U.S. Appl. No. 13/776,842 Office Action", Aug. 7, 2014, 17 pages.
"U.S. Appl. No. 13/776,842 Office Action", May 8, 2015, 29 Pages.
Kim, et al., "Subspace Snooping: Filtering Snoops with Operating System Support", PACT'10 Sep. 11-15, 2010, Vienna, Austria., Sep. 11-15, 2010, 12 pages.
Romanescu, et al., "UNified Instruction/Translation/Data (UNITD) Coherence: One Protocol to Rule Them All", Appears in the 16th International Symposium on High-Performance Computer Architecture (HPCA) Bangalore, India, Jan. 2010, 12 pages.

* cited by examiner

SUPPRESSING VIRTUAL ADDRESS TRANSLATION UTILIZING BITS AND INSTRUCTION TAGGING

RELATED APPLICATIONS

This application is a Continuation of, and claims the priority benefit of, U.S. application Ser. No. 13/667,671 filed Nov. 2, 2012.

BACKGROUND

Embodiments of the inventive subject matter generally relate to the field of computers, and, more particularly, to reducing microprocessor performance loss due to translation table coherency in a multi-processor system.

Multi-processor (MP) coherency protocols in a MP system ensure that all processors use up-to-date data from caches and translation tables (e.g., a translation lookaside buffer (TLB)). When an operating system updates a translation table, all processors in the MP system are notified to handle the change by a TLB MP-coherency operation (hereinafter "MP-coherency operation"). For example, processors are drained and purge affected entries from TLBs (i.e., all instruction queues in the processors are drained) and no instructions must be executed in order to perform the purge. After the purge a processor can answer the MP-coherency operation. When all processors have answered the MP-coherency operation, a modified table entry(ies) is written and all processors are allowed to continue executing instructions. Performance improvements to this technique include a zone (also known as Logical Partition) filtering technique. A zone has its own storage assigned to it which is disjunct to storage assigned to other zones. MP-coherency operations originating from a particular zone do not need to interrupt or drain processors running in a different zone because no storage access of instructions in flight can possibly collide with the purge operation. Only a TLB level(s) that may still hold entries from the originating zone need to be purged. However, processors running in the same zone as the originator must still be interrupted and remain drained until the MP-coherency operation is finished. In another improvement, each processor in the same zone is drained individually. On purge of the processor's own TLB and answering the MP-coherency operation, each processor may continue to execute instructions as long as it does not access the affected storage locations or translation tables. If the processor finds accesses to the affected storage locations or translation tables, the processor waits until it receives a signal that the MP-coherency operation is finished. However, the processors in the MP system still suffer a performance penalty as they are interrupted and drained.

SUMMARY

Embodiments of the inventive subject matter include a method to translate a first virtual address for a first instruction into a first physical address. The method stores the first physical address in a first entry in a translation lookaside buffer (TLB). The method configures a first marker in the first entry in the TLB to indicate that hit suppression is allowed for the first entry in the TLB. The method detects a multi-processor coherency operation that will cause hit suppression for certain entries in a TLB, and cause purging of certain entries in the TLB. The method translates a second virtual address for a second instruction into a second physical address. The method stores the second physical address in a second entry in the TLB. The method configures a second marker in the second entry in the TLB to indicate that the hit suppression is not allowed for the second entry in the TLB, and that the purging is not allowed for the second entry in the TLB. The method receives a first address translation request that indicates a hit in the second entry. The method resolves the first address translation request by returning the second physical address.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
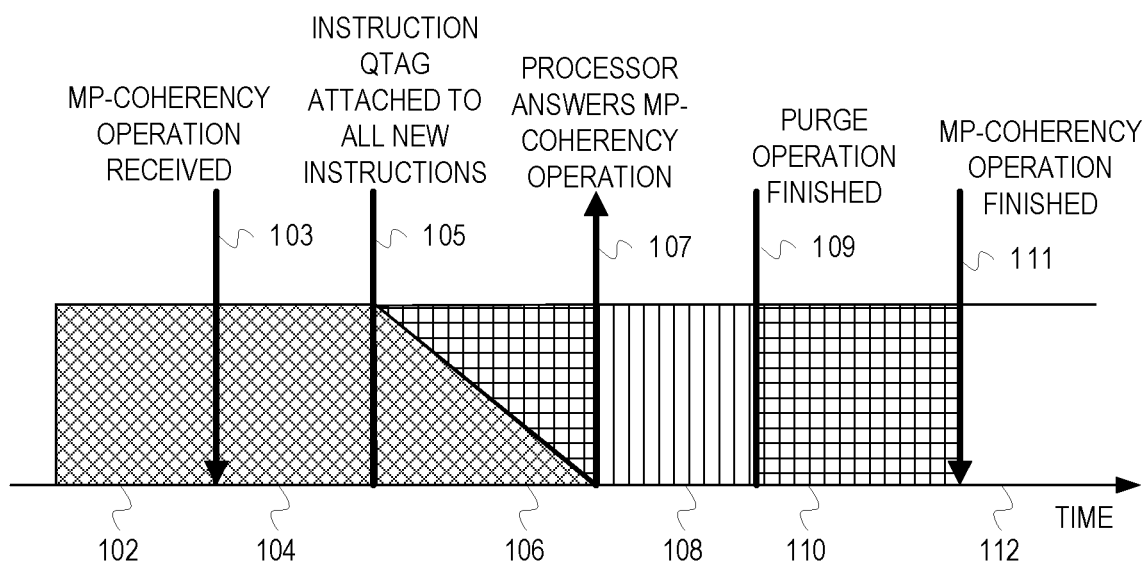
FIG. 1 depicts a timing diagram of multi-processor coherency operations in a microprocessor.

The description that follows includes exemplary systems, methods, techniques, instruction sequences and computer program products that embody techniques of the present inventive subject matter. However, it is understood that the described embodiments may be practiced without these specific details. For instance, examples refer to an emulated purge unit to determine a hit in a translation lookaside buffer. However, embodiments are not limited to an emulated purge unit to determine a hit in a translation lookaside buffer(s). Embodiments can have one or more units in the multi-processor system with program instructions or logic implemented in hardware to determine a hit in the translation lookaside buffer(s). In other instances, well-known instruction instances, protocols, structures and techniques have not been shown in detail in order not to obfuscate the description.

A translation lookaside buffer coherency unit with Emulated Purge (hereinafter "TCUEP") reduces the performance impact caused by interrupt and drain performed for each MP-coherency operation (e.g., a full TLB purge operation, a partial TLB purge operation, etc.) and reduces microprocessor performance loss in a multi-processor system. The TCUEP avoids interrupt and drain of a microprocessor for a purge operation and allows the microprocessor to execute instructions with different views of TLBs in the MP system with respect to observing the MP-coherency operation. For example, two views of the TLBs in the MP system with respect to observing the MP-coherency operation are: a first view, before observing the MP-coherency operation (hereinafter, a non-purged view), and a second view, after observing the MP-coherency operation (hereinafter, a purged view). In accordance with the two views of TLBs in the MP system, an instruction fetch unit classifies the instructions in the MP system as old instructions (instructions in the MP system before observing the MP-coherency operation) and new instructions (instructions in the MP system after observing the MP-coherency operation). The instruction fetch unit classifies the instructions as old and new instructions using QTags. A QTag is similar to a timestamp. A QTag is a single or multi-bit field attached with an instruction before the instruction's physical instruction address is fetched from a TLB. For the new instructions, the TCUEP utilizes the second view of the TLBs in the MP system and the access to the TLB appears as if the TLB was already purged. On each TLB lookup for a new instruction, an emulated purge unit in the TCUEP suppresses a hit(s) (i.e., the hit(s) for an entry that will be purged by the MP-coherency operation) that occurs in the TLB, this is referred to as hit-suppression. The emulated purge unit implements Emulated Purge (a mechanism) for new instructions. Emulated Purge creates a purged view of the TLB on-the-fly. In the purged view, the TLB entries which are not actually purged, appear to be purged. The normal view of the TLB is referred to as the non-purged view. The TCUEP utilizes a selection mechanism using the emulated purge unit to selectively allow or suppress a hit in the TLB based on the age (i.e., old instruction or new instruction) of the instructions in regard to the MP-coherency operation. The TCUEP also allows new TLB entries to be created without restrictions for old instructions. The TCUEP also allows for storage addresses of new instructions, when the new instructions do not interfere with the MP-coherency operation, until the MP-coherency operation is finished. The TCUEP avoids use of microprocessor's internal firmware (e.g., millicode in SystemZ processors) and interrupts for the MP-coherency operation.

FIG. 1 depicts a timing diagram of multi-processor coherency operations in a microprocessor. FIG. 1 includes time intervals 102, 104, 106, 108, 110 and 112. FIG. 1 also includes time instances 103, 105, 107, 109 and 111. During time intervals 102 and 104, old instructions are present in a microprocessor. During the time interval 106, the old instructions along with new instructions are present in the microprocessor. During the time interval 108, a memory management unit (MMU) in the TCUEP instructs the purging of a TLB. During the time interval 108 and 110, only new instructions are present in the microprocessor. In some embodiments, during the time interval 112 the new instructions (corresponding to the time intervals 108 and 110) are re-designated as old instructions based on another MP-coherency operation, and after completion of the MP-coherency operation received at the time-instance 103. The microprocessor maintains a QTagC register, which stores a QTagC to keep a track of the MP-coherency operations received by the microprocessor. The microprocessor also maintains a QTagT register (a source-tag register), which is a source of instruction QTags (an instruction QTag is referred to as a QTagI). On receiving an MP-coherency operation at the time instance 103, the microprocessor increases the value of the QTagC. The microprocessor copies the value of the QTagC to the QTagT register at the next interruptible point (i.e., the time instance 105) after which the new instructions utilizing a purged view of the TLB are fetched. The microprocessor also instructs an emulated purge unit in the TCUEP to enable Emulated Purge. The TCUEP may enable Emulated Purge and/or a translation blocking technique (as described below) in the time interval between the increment of the QTagC and copying of the value of the QTagC to the QTagT register. It is noted that when the TCUEP enables Emulated Purge prior to the incremented QTagC being copied to the QtagT register. Emulated purge and/or the translation blocking technique is not enabled by components (e.g., comparators, etc.) of the TCUEP for old instructions (i.e., instructions having QTagI value less than the value of QTagC).

Before receiving an MP-coherency operation, the QTagC and the register QTagT have their initial values for the MP-coherency operation. For example, an initial value before receiving the MP-coherency operation is 0. An instruction fetch unit in the microprocessor attaches QTagIs having the initial value of the QTagC while fetching the old instructions. At the time instance 103, the microprocessor receives the MP-coherency operation. For example, the MP-coherency operation instructs the microprocessor to purge the TLB. On receiving the MP-coherency operation, the microprocessor increments the value of QTagC. The microprocessor copies the incremented value of the QTagC register to the QTagT register at the next interruptible point (i.e., the time instance 105). At the time instance 105, the microprocessor attaches QTagI to the new instructions. The QTagIs attached with the new instructions have the incremented value of the QTagC. A new MP-coherency operation(s) is typically not received until the MP-coherency operation is finished at the time instance 111. It is noted that for the MP-coherency operation, the QTagC value is typically not reset or modified at the end of the MP-coherency operation. The new MP-coherency operation(s) may be received after the time instance 111.

During the time interval 106, the old instructions (i.e., QTagIs having the initial value of QTagC) and the new instructions (i.e., QTagIs having the incremented value of QTagC) are present in the microprocessor. During the time interval 106, the emulated purge unit in the TCUEP determines whether Emulated Purge is used to access the TLB for instructions present in the microprocessor. The emulated purge unit determines the use of Emulated Purge based on the QTagI value of the instructions. An instruction's QTagI value is compared with the value of QTagC. When the instruction's QTagI value is greater than or equal to the value of QTagC, the emulated purge unit utilizes Emulated Purge. When the instruction's QTagI value is smaller than the value of QTagC, the emulated purge unit does not utilize Emulated Purge. In one implementation, when the QTagC and the QTagI are single bit wide, the emulated purge unit enables Emulated Purge when the QTagI value is equal to the value of the QTagC. The emulated purge unit does not enable Emulated Purge when the QTagI value is not equal to the value of QTagC. In the embodiments described in detail, the microprocessor receives one MP-coherency operation at a time and the microprocessor does not receive another MP-coherency operation before an answer is sent to the MP-coherency operation. Hence, the emulated purge unit enables Emulated Purge when the QTagI value is equal to the value of QTagC.

When Emulated Purge is enabled, the TCUEP allows formation of new TLB entries for old instructions. The TCUEP does not limit the formation of the new TLB entries as the TLB is not yet purged. The new TLB entries are purged at the time of a TLB purge operation (i.e., the time interval 108). For new instructions, a memory management unit (MMU) utilizes the translation blocking technique during the time interval 106, 108 and 110. In one implementation of the translation blocking technique, when the MP-coherency operation indicates an invalid page table entry, the MMU compares the page index of the new translation against the page index received with the MP-coherency operation to determine if a storage access is affected. When the result of the compare is a match, the MMU blocks the storage access and does not allow the formation of a new TLB entry for the translation. In some embodiments, when the TLB is a hierarchical TLB, the MMU may allow a storage access and formation of a partial TLB entry for the part of translation not affected by the MP-coherency operation. When the result of compare is a no match, a new TLB entry may be formed as the translation is not affected by the MP-coherency operation. In some implementations of the translation blocking technique, when the MP-coherency operation indicates purge of the entire TLB, the MMU blocks storage accesses for all translations. In other implementations of the translation blocking technique, the MMU may block storage accesses for a certain segment of the TLB, a range of TLB entries, etc. The comparison logic for the translation blocking technique may be implemented in hardware or as program instructions in one or more components of the MMU. During time interval 106 usage of the translation blocking technique is enabled by the same rules as the emulated purge (i.e., based on a global enable signal and a QTag compare). For time interval 108 and 110 translation blocking is typically always used, without utilizing the global enable signal and the QTag compare.

The translation blocking technique and Emulated Purge can operate independently. The translation blocking technique and Emulated purge may utilize different sub-sets of information (e.g., information about which TLB entries to purge) from the MP-coherency operation. For example, with the utilization of a different sub-set of information, Emulated Purge may suppress hits for the TLB entries corresponding to certain translations allowed by the translation blocking technique (e.g., the translations for new instructions). Similarly, the translation blocking technique may block certain storage accesses to TLB entries for which Emulated Purge does not suppress hits. In some embodiments, the TLB purge operation may also purge the TLB entries blocked by the translation blocking technique. The MMU may repeatedly perform these translations when the TLB purge operation purges the TLB entries corresponding to these translations, and before the TLB entries are utilized again. During the time interval 106, the MMU may repeatedly perform translations that are hit-suppressed by Emulated Purge but not blocked by the translation blocking technique. Such repeated translations result in the loss of performance. To prevent purge or hit-suppression of the TLB entries corresponding to the translations allowed by the translation blocking technique, the TLB utilizes a rigid marker (e.g., a rigid flag, a rigid bit, etc.) for each TLB entry. The rigid marker is set for a TLB entry during the time interval 106 when a translation for a new instruction is performed, and the translation passes the translation blocking technique (after receiving the MP-coherency operation). The rigid marker, when set for an entry, prevents purge of the TLB entry by the TLB purge operation. The rigid marker, when set for a TLB entry, also prevents suppression of a hit for the TLB entry. When an already existing TLB entry is hit-suppressed, but its storage access passed the translation blocking technique, the old entry is removed/purged from TLB before the new entry can be formed (i.e., the new entry completely replaces the hit-suppressed TLB entry). In some embodiments the TLB entry may just have its rigid marker set.

At the time instance 107, the microprocessor completes execution of the last of the old instructions. At the time instance 107, only instructions having QTagI values equal to or greater than the value of the QTagC (i.e., the value of QTagC incremented on receiving the corresponding to MP-coherency operation) remain in the microprocessor. For a single MP-coherency operation, the instructions having the same QTagI values (equal to the incremented value of the QTagC on receiving the MP-coherency operation) remain in the microprocessor. At the time instance 107, the microprocessor answers the MP-coherency operation. The microprocessor signals to the initiator of the MP-coherency operation (e.g., by means of a Serialization Manager (SM), a TLB MP-coherency manager, etc.) that the microprocessor has observed the MP-coherency operation. The SM may be implemented at another microprocessor in the multi-processor system.

During the time interval 108, the microprocessor instructs the MMU to purge the TLB. The MMU deletes the entries in the TLB and resets rigid markers (e.g., resets the rigid flag, clears the rigid bit, etc.) for all TLB entries. In some embodiments, the MMU may reset the rigid markers in a separate operation after deleting the TLB entries. During the time interval 108, the microprocessor also disables Emulated Purge. At the end of the time interval 108 (i.e., at time instance 109), the microprocessor finishes purging the TLB.

During the time interval 110, only new instructions are present in the microprocessor. The MP-coherency operation is not finished in the system and storage accesses are allowed in accordance with the translation blocking technique. Before the TLB can form a new TLB entry, the MMU in the TCUEP compares the new translation against the entries purged in the MP-coherency operation. The MMU allows the formation of a new TLB entry and an access to the storage when the new translation is not affected by the MP-coherency operation.

During the time interval 112, the MP-coherency operation is finished. The MMU disables translation blocking and allows all storage accesses. On completion of the MP-coherency operation, the values of QtagC and QtagT registers remain unchanged and subsequent instructions are fetched and executed with QTagI value (from the QtagT register) attached.

Figure 2:
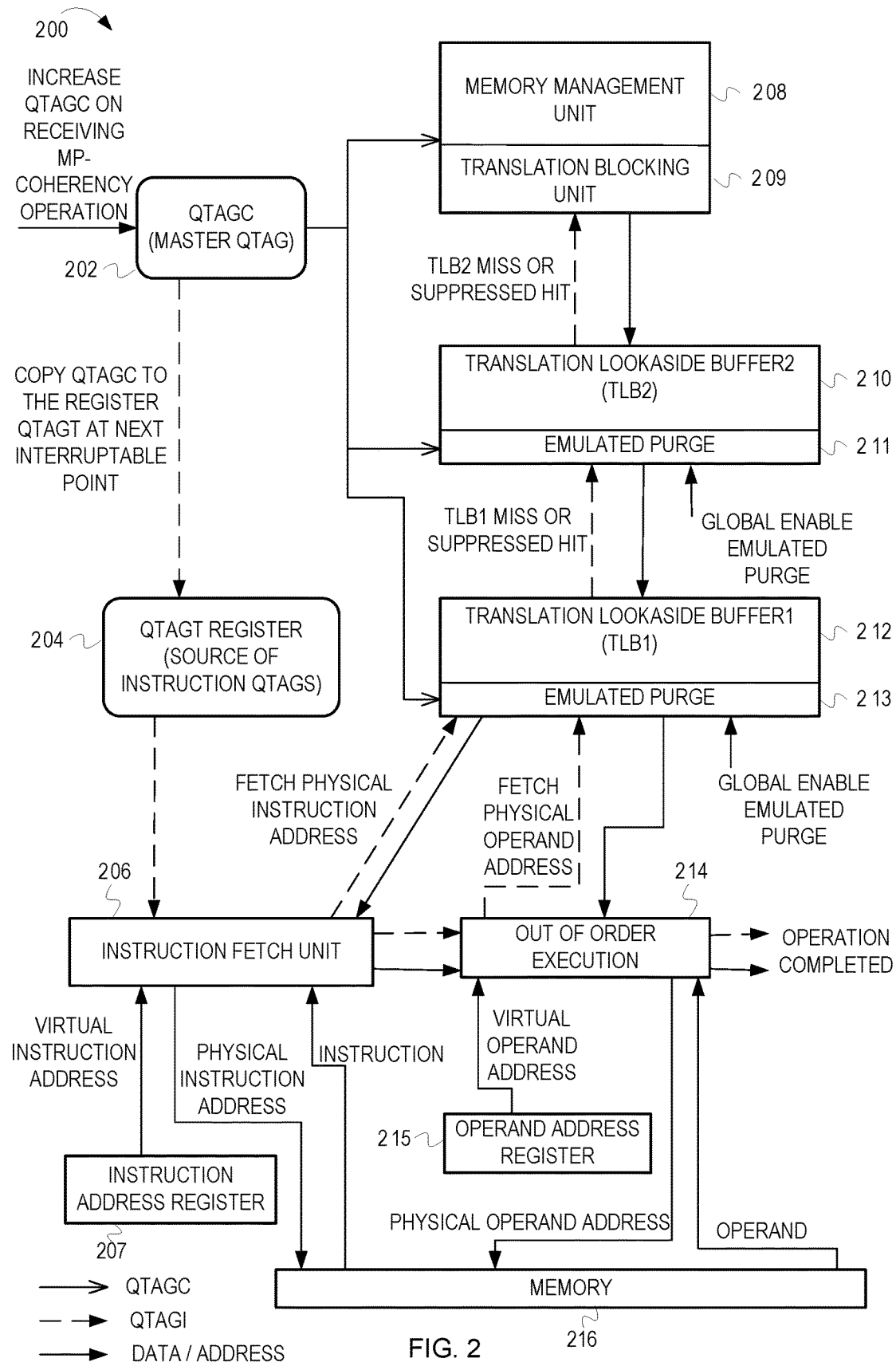
FIG. 2 depicts an example concept diagram of selected components of a translation lookaside buffer coherency unit with Emulated Purge to reduce microprocessor performance loss in a multi-processor system.

FIG. 2 depicts an example concept diagram of selected components of a translation lookaside buffer coherency unit with Emulated Purge to reduce microprocessor performance loss in a multi-processor system. FIG. 2 depicts a translation lookaside buffer coherency unit with Emulated Purge (TCUEP) 200. The TCUEP 200 includes a QTagC register 202 (also referred to as a master-tag register), a QTagT register 204, an instruction fetch unit 206, an instruction address register 207, a memory management unit 208 having a translation blocking unit 209, a TLB 210 having an emulated purge unit 211, a TLB 212 having an emulated purge unit 213, an out of order execution unit 214, an operand address register 215 and a memory 216. In some embodiments, the memory 216 may not be a part of the TCUEP 200. The TLB 210 and the TLB 212 may be implemented as instruction translation lookaside buffers and operand translation lookaside buffers. The instruction translation lookaside buffers and the operand translation lookaside buffers include their separate emulated purge units. The TLB 212 is the first level TLB in the TLB hierarchy and the TLB 210 is the second level of the TLB in the TLB hierarchy. Although, FIG. 2 depicts two levels of the TLB hierarchy, the TCUEP may have fewer than two or more than two levels of the memory hierarchy.

The QTagC register 202 stores a master QTag (i.e., QTagC) in the TCUEP. The QTagC is a timestamp to track the current state of a microprocessor. The QTagC helps a microprocessor to keep a track of the MP-coherency operations received by the microprocessor. The microprocessor increases the value of the QTagC register 202 on receiving an MP-coherency operation. In some embodiments, the microprocessor may set a global enable emulated purge signal on receiving the MP coherency operation. In some embodiments, when the microprocessor implements zone filtering, it only tracks MP-coherency operations from within the same zone as the microprocessor. The microprocessor does not increment the value in the QTagC register on receiving an MP-coherency operation from a different zone (i.e., different from the zone of the microprocessor).

The QTagT register 204 is the source of instruction QTags (i.e., QTagIs). The microprocessor copies the value of the QTagC register 202 to the QTagT register 204 at the next interruptible point after receiving the MP-coherency operation. In some embodiments, the microprocessor sets the global enable emulated purge signal at the next interruptible point after receiving the MP-coherency operation. It is noted that, the next interruptible point is the latest point in time when the microprocessor can set the global enable emulated purge signal.

The instruction fetch unit 206 receives a virtual instruction address of an instruction from the instruction address register 207. The instruction fetch unit 206 fetches the physical address of the instruction using a search instruction (e.g., a translation request) from the TLB 212. The search instruction includes the virtual instruction address for translation in the TLB 212. The instruction fetch unit 206 attaches a QTagI with the search instruction. The instruction fetch unit 206 uses the value in the QTagT register 204 as the source of the QTagI. The QTagI indicates when the search instruction was created (e.g., before receiving the MP-coherency operation or after receiving the MP-coherency operation). The instruction fetch unit sends the search instruction to the TLB 212.

When the TLB 212 includes an entry for the virtual address in the search instruction (i.e., a hit in the TLB 212), the emulated purge unit 213 in the TLB 212 determines whether to suppress the hit or to allow the translation. The emulated purge unit 213 in the TLB 212 receives the QTagC value from the QTagC register 202. The emulated purge unit 213 receives the QTagI attached with the search instruction. The emulated purge unit 213 also receives a global enable emulated purge signal, set by the microprocessor. The emulated purge unit 213 suppresses the hit in the TLB 212 when the value of the QTagI is equal to the value of the QTagC and when TLB purge information indicates a match for the TLB entry. In some embodiments, when the microprocessor receives one or more MP-coherency operations before a first MP-coherency operation is finished (or an answer is sent for the first MP-coherency operation), the microprocessor utilizes QTagIs based on a value saved from the first MP-coherency operation and not based on the value of the QTagC. Hence, a QTagI value may be greater than the value of the QTagC (which is the value in the QTagC register). Hence, when the microprocessor receives one or more MP-coherency operations before the first MP-coherency operation is finished, the emulated purge unit 213 suppresses a hit in the TLB 212 when the QTagI value is greater than or equal to the value of the QTagC, and when the TLB purge information indicates a match for the TLB entry. The emulated purge unit 213 does not suppress the hit in the TLB 212 when the value of the QTagI is smaller than the value of the QTagC. The value of QTagI, smaller than the value of QTagC, indicates that the translation in the TLB 212 was requested before receiving the MP-coherency operation and the hit in the TLB 212 is allowed. When the emulated purge unit 213 allows the hit in the TLB 212, the instruction fetch unit 206 receives the physical address of the instruction (for which the virtual address is present in the search instruction).

The emulated purge unit 211 in the TLB 210 and the translation blocking unit 209 in the memory management unit 208 also receive the QTagC value from the QTagC register 202. When the TLB 212 does not include the entry for the virtual address in the search instruction (i.e., a miss in the TLB 212), the TLB 212 sends the search instruction to the TLB 210. In some embodiments, the TLB 212 sends the search instruction to the TLB 210 and the memory management unit 208 at the same time. The emulated purge unit 211 in the TLB 210 performs similar operations as the emulated purge unit 213 in the TLB 212. When the TLB 210 includes an entry for the virtual address in the search instruction (i.e., a hit in the TLB 210), the emulated purge unit 211 in the TLB 210 determines whether to suppress the hit or to allow the hit based on similar conditions as used by the emulated purge unit 213. When the emulated purge unit 211 allows the hit in the TLB 210, the instruction fetch unit 206 receives the physical address of the instruction from the TLB 210. The physical address travels through the TLB hierarchy and may also be stored in the TLB 212. When the TLB 210 does not include the entry for the virtual address in the search instruction (i.e., a miss in the TLB 210), the TLB 210 sends the search instruction to the memory management unit 208. The translation blocking unit 209 in the memory management unit 208 implements the translation blocking technique based on the TLB purge information when the global enable emulated purge signal is set. The translation blocking unit 209 in the memory management unit 208 allows memory usage when the value of the QTagI is smaller than the value of the QTagC. When the translation blocking unit 209 allows memory usage, the memory management unit 208 sends the physical address of the instruction to the higher levels of the TLB hierarchy and to the instruction fetch unit 206. The QTagI, attached to the search instruction, carries forward with the search instruction when the search instruction is carried forward to the lower levels in the TLB hierarchy and to the memory management unit 208.

The instruction fetch unit 206 receives the physical address of the instruction and fetches the instruction from the memory 216. In one implementation, the instruction fetch unit 206 sends the instruction to the out of order execution unit 214. The instruction fetch unit 206 attaches a QTagI to the instruction when sending it to the out of order execution unit 214. The QTagI remains attached with the instruction as long as the instruction is present in an instruction pipeline in the microprocessor.

The out of order execution unit 214 executes the instruction received from the instruction fetch unit 206. In some embodiments, the out of order execution unit 214 receives an operand's virtual address from the operand address register 215. The out-of-order execution unit 214 fetches the physical address of the operand from the TLB hierarchy using similar operations as the instruction fetch unit 206 (to fetch the physical address of the instruction). The operand execution unit 214 receives the physical address of the operand and fetches the operand from the memory 216. The out of order execution unit 214 executes the instruction and sends the result (with QTagI attached) to the next stage in the instruction pipeline to complete the instruction.). The memory management unit 208 can start purging the TLBs 210 and 212 based on completion of the last old instruction. In some embodiments, the microprocessor disables the global enable emulated signal as soon as the purge starts and sends an answer to the MP-coherency operation.

The TLB 210 and the TLB 212 also maintain a rigid marker for each TLB entry. The rigid marker may be included in the emulated purge unit 211 and emulated purge unit 213 which utilize the rigid marker in one or more logical comparisons.

Once the microprocessor copies the incremented value of QTagC to the QTagT register, the instruction fetch unit 206 attaches QTagIs (having the incremented value of QTagC) with new instructions to be fetched. For an instruction(s) already in a cache, the instruction fetch unit 206 typically re-evaluates the physical address of the instruction(s), and the re-evaluation may collide with the MP-coherency operation. The instruction fetch unit 206 sends a search instruction(s) (having the virtual address of the instruction(s)) to the TLB 212. In case of a miss or hit-suppression at one or more TLBs in the TLB hierarchy, the memory management unit 208 re-translates the virtual address of the instruction(s). If the translation blocking unit 209 does not block the translation(s), the instruction(s) are valid.

In some embodiments, the microprocessor receives multiple MP-coherency operations from within the same zone. The microprocessor increases the value of the QTagC register 202 for each MP-coherency operation received from the same zone. The number of MP-coherency operations that the microprocessor can handle at a time depends on the size of the QTagC register 202. The microprocessor increases the value of the QTagC register 202 on observing the additional MP-coherency operation. With a finite size of the QTagC register 202, the microprocessor may delay sending an answer to an MP-coherency operation until the value of the QTagC register 202 can be incremented FIG. 5 describes a TCUEP to handle multiple MP-coherency operations in parallel.

In one implementation, the microprocessor observes only a single MP-coherency operation at a time from a single MP-coherency manager. The TCUEP utilizes a one-bit wide QTagC register. For the single MP-coherency operation, each instruction can only be older (i.e., QTagC=0) or younger (i.e., QtagC=1) than the MP-coherency operation. In such implementation, the QTagI for instructions is also one-bit wide. When the QTagI and the QTagC are not equal, the instruction is older and the non-purged view of a TLB is utilized. The new instructions get the QTagI which is equal to the QTagC. For the new instructions, the purged view of the TLB is utilized. When the microprocessor completes execution of the old instructions, QTagIs of all instructions are equal to the QTagC. The microprocessor then answers the MP-coherency operation. The memory management unit 208 purges the TLBs 210 and 212. The microprocessor then inverts the QTagC and is ready to observe another MP-coherency operation from a MP-coherency initiator.

Figure 3:
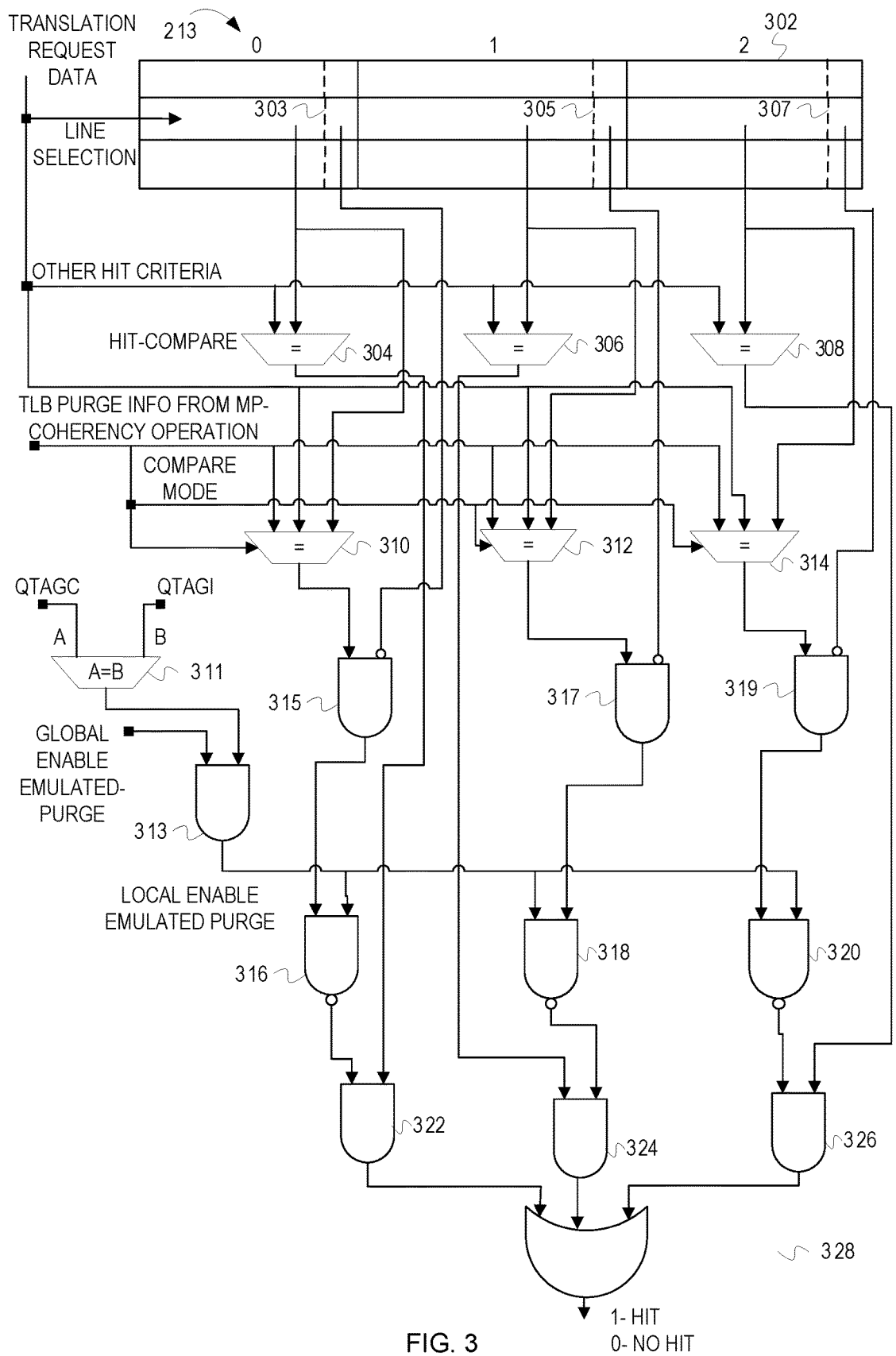
FIG. 3 depicts an example concept diagram of selected components of an emulated purge unit to determine a decision for hit in a translation lookaside buffer.

FIG. 3 depicts an example concept diagram of selected components of an emulated purge unit to determine a decision for hit in a translation lookaside buffer. FIG. 3 depicts the emulated purge unit 213, as described with reference to FIG. 2 above. The emulated purge unit 213 includes a TLB array 302, a comparator 304, a comparator 306, a comparator 308, a comparator 310, a comparator 311, a comparator 312, a comparator 314, a logical NAND gate 316, a logical NAND gate 318, a logical NAND gate 320, a logical AND gate 313, a logical AND gate 315, a logical AND gate 317, a logical AND gate 319, a logical AND gate 322, a logical AND gate 324, a logical AND gate 326, and a logical OR gate 328. The TLB array 302 consists of three compartments (0, 1 and 2) which are read out in parallel for a line based on a line selection signal. The TLB array 302 also includes rigid markers 303, 305 and 307 in each of the compartments in a line. Although, the TLB array 302 includes a rigid marker for each compartment in each line, for simplification FIG. 3 does not depict all rigid markers. The TLB array 302 receives translation request data (e.g., Virtual Address for translation, Address Space Control Element, etc.) which includes line selection data and other hit criteria. The TLB array 302 may consist of more than or less than three compartments, which are read out in parallel. The line selection data selects a line using a part of the virtual address of an instruction/operand which represents the line number. The comparators 304, 306 and 308 compare the data read from the compartments 0, 1 and 2 respectively against the other hit criteria. The other hit criteria can be another part of the virtual address, an address space control element, etc. In case of a match in the compartments 0, 1 and/or 2, the respective comparators 304, 306 and/or 308 return a hit, i.e., the output of the respective comparator is 1. Although, not depicted in FIG. 3, on a hit in a compartment, the TLB array 302 also returns the data (e.g., absolute address, protection flags, etc.) in the respective compartment.

The comparators 310, 312 and 314 receive the output from the compartments 0, 1 and 2 of the TLB array 302 respectively, the translation request data, and TLB purge information from an MP-coherency operation. The TLB purge information from the MP-coherency operation specifies the type of MP-coherency operation (e.g., invalidate page table entry(ies) (IPTE), invalidate data address translation entry(ies) (IDTE), purge TLB of Address Space Control Element (PTOA), etc.) Based on the type of MP-coherency operations, the comparators 310, 312 and 314 perform comparisons on certain parameters (e.g., comparison of a page index or a range of page indexes and parts of page table origin in case of IPTE; comparison of a segment index or a range of segment indexes and parts of table origin from Address Space Control Element in case of IDTE; comparison of table origin from Address Space Control Element in case of PTOA, etc.). The comparators 310, 312 and 314 also receive a compare mode signal to switch the comparators 310, 312 and 314 in a compare mode. The compare mode signal is derived from the TLB purge information from the MP-coherency operation. The comparators 310, 312 and 314 verify for the hits in the respective compartments 0, 1 and 2 against the data to be purged later (i.e., in accordance with the MP-coherency operation). When there is a match, the output of the respective comparator is 1.

The comparator 311 receives the value of a QTagC and the value of a QTagI. The comparator 311 receives the value of the QTagC from a QTagC register and the value of QTagI from the instruction QTag associated with a search instruction. When the value of QTagI, B, is equal to the value of QTagC, A, the output of comparator 311 is a 1. The output of the comparator 311 and a global enable emulated purge signal are inputs to the logical AND gate 313. The global enable emulated purge signal is set by a microprocessor. The emulated purge unit 213 enables Emulated Purge when the global enable emulated purge is set (i.e., 1). The emulated purge unit 213 disables Emulated Purge, when the global enable emulated purge is reset (i.e., 0). The output of logical AND gate 313, is a local enable emulated purge signal. The local enable emulated purge signal indicates whether to use a purged view or a non-purged view of the TLBs.

The logical AND gates 315, 317 and 319 receive the outputs of comparators 310, 312 and 314, respectively. The logical AND gates 315, 317 and 319, also receive the inverted values of the rigid markers 303, 305, and 307, respectively. The rigid markers 303, 305 and 307 do not affect comparisons at the comparators 304, 306, and 308 as well as the comparators 310, 312 and 314. However, when a rigid marker (e.g., the rigid marker 303) is set as '1', the inverted value of the rigid marker is '0' and when the inverted value is fed to the logical AND gate (e.g., the logical AND gate 315), the output of the logical AND gate is '0'. The outputs of the logical AND gates 315, 317, and 319 take into account the effect of rigid markers 303, 305, and 307 and helps in suppressing hit suppression by the logical NAND gates 316, 318, and 320 when the rigid markers are set.

The logical NAND gates 316, 318 and 320 receive the output of the logical AND gates 315, 317 and 319, respectively. The local enable emulated purge signal is also an input to the logical NAND gates 316, 318 and 320. The outputs of the logical NAND gates 316, 318 and 320 are inputs to the logical AND gates 322, 324 and 326 respectively. The logical AND gates 322, 324 and 326 also receive the result of comparators 304, 306 and 308 respectively as inputs. The result of comparators 304, 306 and 308 indicate whether there is a hit in the respective compartment 0, 1 and 2 of the TLB array 302. The outputs of the logical AND gates 322, 324 and 326 indicate whether there is a hit in the respective compartment 0, 1 and 2 of the TLB array 302 taking into account the effect of local enable emulated purge signal and suppressed hits in the compartments 0, 1 and 2, via the signals from the logical NAND gates 316, 318 and 320 respectively. The logical OR gate 328 determines a TLB hit when the output of either of the logical AND gates 322, 324 and 326 is 1. It is noted that FIG. 3 describes one implementation of the emulated purge unit 213. In other implementations, the emulated purge unit 213 may be implemented using logical NOR gates, lookup tables, etc.

Figure 4:
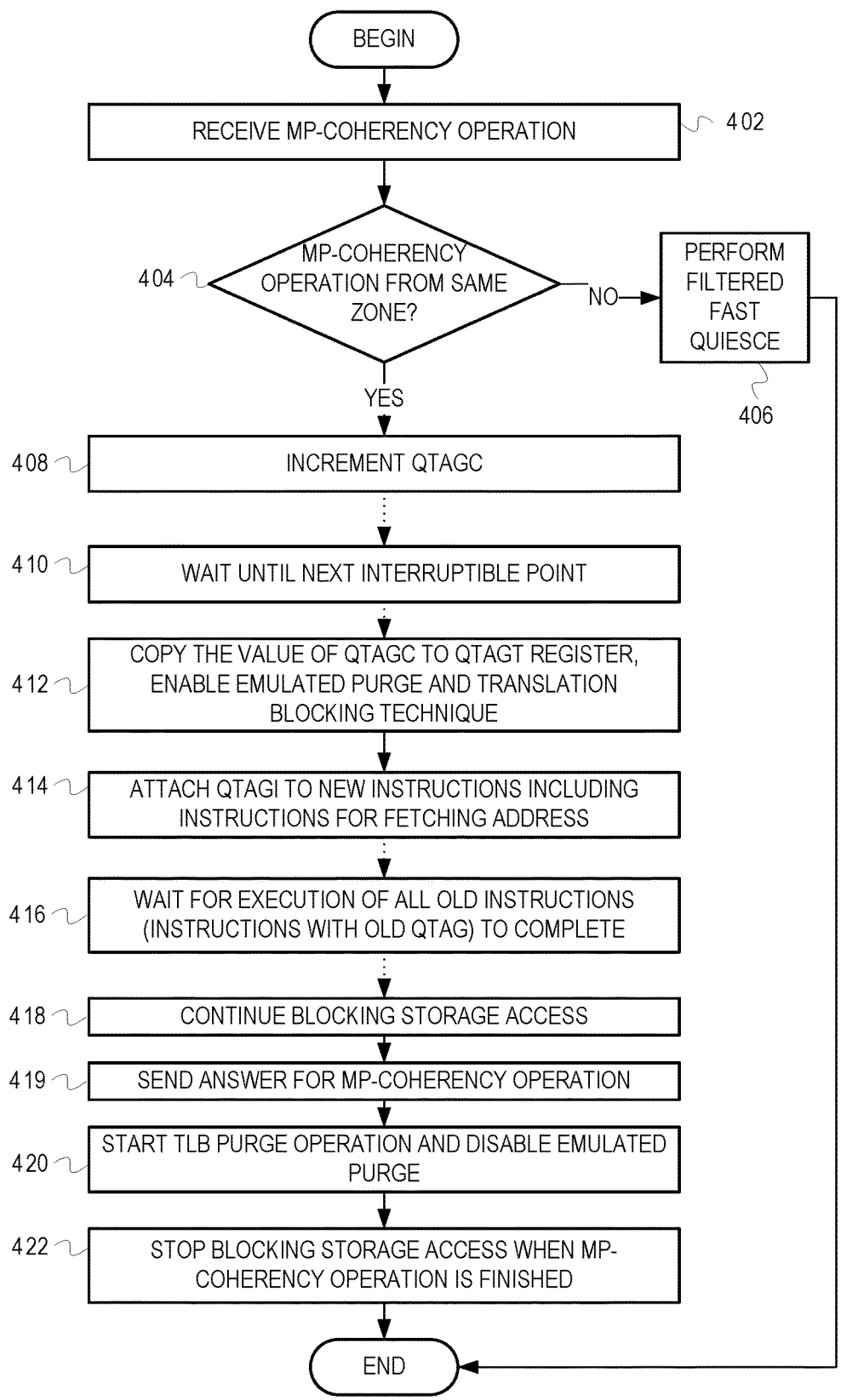
FIG. 4 depicts a flow diagram of example operations to manage an MP-coherency operation in a microprocessor.

FIG. 4 depicts a flow diagram of example operations to manage an MP-coherency operation in a microprocessor.

At block 402, the microprocessor receives the MP-coherency operation. For example, the MP-coherency operation is a full TLB purge operation for a TLB in the microprocessor.

At block 404, the microprocessor determines whether the MP-coherency operation is from a microprocessor in the same zone (i.e., the same Logical Partition as the microprocessor and the MP-coherency operation affects the storage (e.g., TLBs, etc.) shared by the microprocessor). If the MP-coherency operation is from the same zone, control flows to block 408. If the MP-coherency operation is not from the same zone, the microprocessor and the initiator of the MP-coherency operation have disjoint storage and the control flows to block 406.

At block 406, the microprocessor performs a filtered fast quiesce. In the filtered fast quiesce, a MMU purges the TLBs (i.e., TLBs lower in the TLB hierarchy than the TLB for which the MP-coherency operation indicates a TLB purge operation) in the background without affecting the microprocessor.

At block 408, the microprocessor increments a QTagC. The microprocessor increments the value of the QTagC to keep track of the MP-coherency operations. For example, the initial value of the QTagC is 0 and the microprocessor increments the value of the QTagC to 1.

At block 410, the microprocessor waits until the next interruptible point. For example, the microprocessor waits until the microprocessor fetches new instructions after incrementing the value of the QTagC.

At block 412, the microprocessor copies the value of the QTagC to a QTagT register and an emulated purge unit enables Emulated Purge. The microprocessor copies the value of QTagC to the QTagT register and uses the value in the QTagT register to attach QTagIs to the new instructions (i.e., instructions to be fetched henceforth). As soon as a new instruction is in flight, the emulated purge unit enables Emulated Purge and a translation blocking unit enables a translation blocking technique. For example, the microprocessor sets a global enable emulated purge signal as 1, and the emulated purge unit enables Emulated Purge based on the global enable emulated purge signal. In some embodiments, the microprocessor may fetch an instruction before the instruction is considered to be in-flight. However, the emulated purge unit enables Emulated Purge before the microprocessor fetches the instruction.

At block 414, the microprocessor attaches QTagIs to the new instructions including instructions for fetching address. For example, the microprocessor attaches the QTagIs to instructions to be executed and the microprocessor attaches the QTagIs to the instructions to fetch the physical address of instructions from the TLB.

At block 416, the microprocessor waits for execution of all old instructions to complete. The old instructions are instructions with the QTagI having the initial value of the QTagC (i.e., the value of QTagC before receiving the MP-coherency operation).

The microprocessor utilizes a global completion table (GCT) to keep track of instructions in flight and age of the instructions. The microprocessor can determine when the execution of the old instructions is complete by tracking the instructions' age. In one implementation, the microprocessor utilizes a counter to track instructions' age. For example, the microprocessor maintains a counter for every unique value of the QTagIs attached with the instructions. The counter value for a QTagI indicates the number of instructions in the microprocessor for the QTagI. For example, when the QTagC and QTagI are single bit wide, a counter for a QTagI indicates the number of instructions in the microprocessor before receiving an MP-coherency operation. In some embodiments, for multiple MP-coherency initiators (which initiate multiple MP-coherency operations in parallel), the microprocessor may maintain separate counters for unique values of the QTagIs for each MP-coherency initiator. When the microprocessor fetches an instruction, the microprocessor increments the counter corresponding to the instruction's QTagI. Every time the microprocessor completes execution of an instruction, and removes the instruction from the instruction pipeline, the microprocessor decrements the counter corresponding to the instruction's QTagI. When the counter corresponding to the QTagI (for instructions in the microprocessor before receiving the MP-coherency operation, i.e., old instructions) is zero, the microprocessor an MMU can purge the TLB and the microprocessor can answer the MP-coherency operation. However, it is noted that the translation blocking technique remains enabled when the counter is zero. The size of counter is the maximum number of instructions in flight in the microprocessor.

In another implementation, a combinatorial logic can be utilized to collect the QTagIs for active instructions. A QTagIValid bit for each entry in the GCT indicates whether the entry in the GCT for the instruction is valid. The AllSameTag expression (mentioned below), determines whether all instructions in the GCT have the same QTagI. For example, when there are different QTagIs (e.g., for old and new instructions), the AllSameTag results in a '1'. When all instructions in the GCT have identical QTagIs, it results in a '0'. It is noted, that for the address translation of a first instruction's instruction fetch after the MP-coherency operation is received, an entry in the GCT is reserved before the instruction fetch. In one implementation, the microprocessor sets the global enable emulated purge signal on incrementing the QTagC register on receiving the MP-coherency operation. Similarly, a falling edge of the AllSameTag signal triggers the microprocessor to reset the global enable emulated purge signal.

For example, for 3 instruction entries in the GCT, QTagI1 indicates QTagI for the first entry in GCT:

```
AllSameTag =
              ( (QTagI1 OR not QTagIValid1) &
                (QTagI2 OR not QTagIValid2) &
                (QTagI3 OR not QTagIValid3)
              )
              OR not
              ( (QTagI1 & QTagIValid1) OR
                (QTagI2 & QTagIValid2) OR
                (QTagI3 & QTagIValid3)
              )
```

It is noted that the above combinatorial logic works for QTagIs that are only one bit wide. For simplicity, it is noted that all instructions that follow an instruction with an exception are removed from the GCT (including the one with the exception). Hence, detection for absence of old instructions works flawlessly. In some embodiments, when implementation of the microprocessor's exception handling deviates, the detection logic may be adapted accordingly.

Embodiments are not limited to the above mentioned techniques to track the age of instructions and determining the completion of old instructions. Embodiments can utilize other similar techniques to track the age of instructions and completion of old instructions.

At block 418, the translation blocking unit in the MMU continues blocking storage accesses (i.e., the translation blocking technique is in effect). The translation blocking unit blocks creation of new entries in the TLB (for the new instructions) and access to memory locations which the TLB entries (corresponding to new translations) reference. The translation blocking unit compares new translations against the entries purged in the MP-coherency operation. For example, the translation blocking unit compares the page index of a new translation against the page index in the TLB purge information of the MP-coherency operation. When there is a match, the translation blocking unit blocks storage access and a new TLB entry is not created for the translation.

At block 419, the microprocessor sends an answer to the MP-coherency operation. For example, the microprocessor sends an answer signal to the MP-coherency manager that the MP-coherency operation has been observed.

At block 420, the MMU starts the TLB purge operation and Emulated Purge is disabled. The MMU starts deleting the entries in the TLB. However, the MMU does not delete the entries in the TLB for which a rigid marker is set. The microprocessor may set the global enable emulated purge signal to 0, to disable Emulated Purge.

At block 422, the translation blocking unit stops blocking the translations when the MP-coherency operation is finished. In some embodiments, the initiator of the MP-coherency operation writes a new translation table to the memory on completion of the MP-coherency operation. The translation blocking unit stops blocking new translations to be stored in the TLB and subsequent storage accesses on completion of the MP-coherency operation.

Although, not illustrated in the flow diagram, TLB purge operations and translation blocking operations may occur independently. The TLB purge operations and the translation blocking operations can occur independently based on information in the MP-coherency operation. The TLB purge operations and the translation blocking operations may utilize different sub-sets of the information in the MP-coherency operation. For example, a TLB entry to be purged is not blocked during translation and vice versa. In some embodiments, the TLB passes an address for a storage access to the lower level TLBs and the MMU after a hit is suppressed, which is similar to operations after a miss in the TLB. The address may pass the translation and be saved for use with new instructions and the rigid marker may be set.

FIGS. 1-4 describe one implementation of a single-thread processor receiving one MP-coherency operation at a time. However, it is noted that extensions to symmetric multi-threading (SMT) and Pipelined/Parallel MP-coherency operations are possible as described below.

Figure 5:
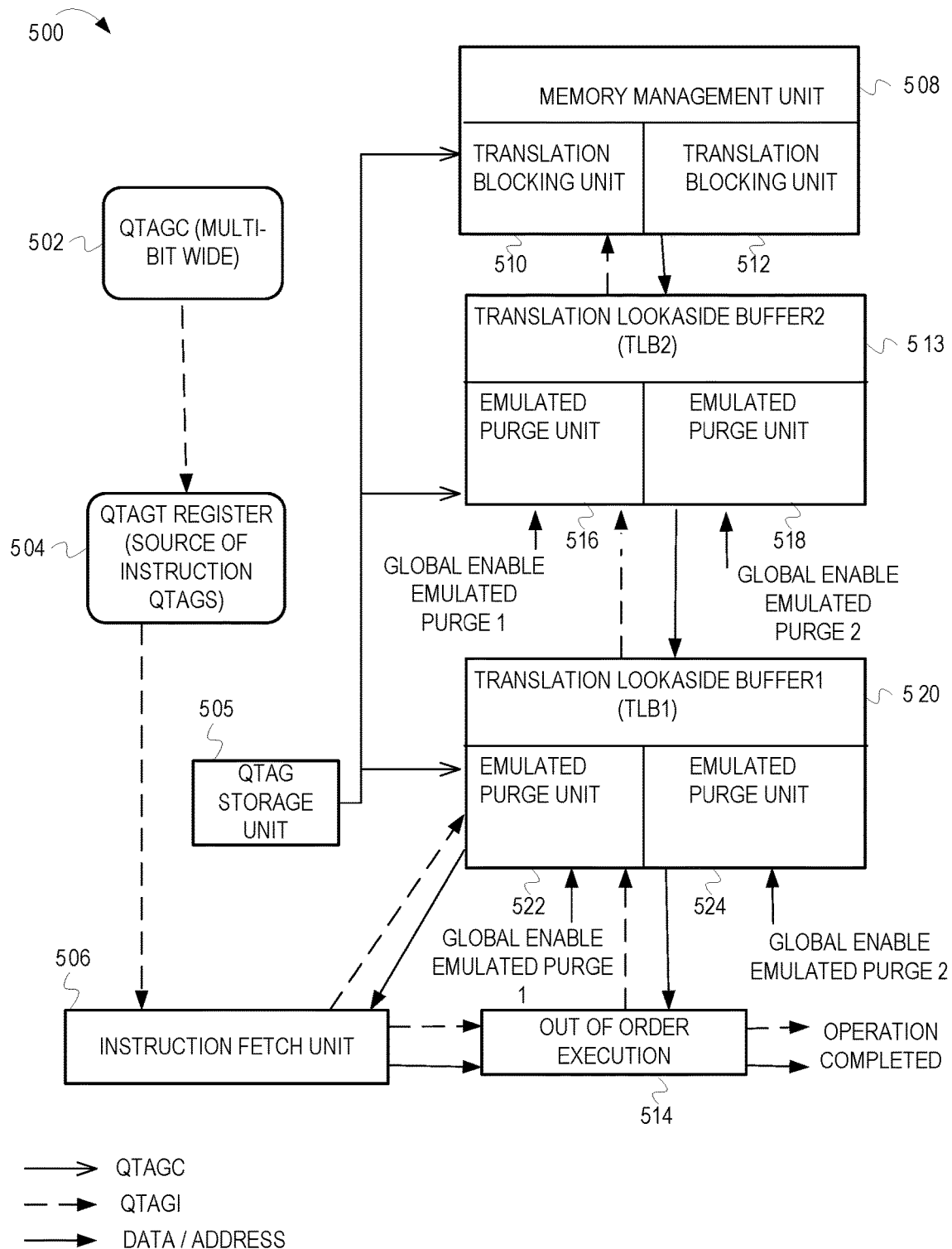
FIG. 5 depicts an example concept diagram of selected components of a translation lookaside buffer coherency unit with Emulated Purge to handle multiple MP-coherency operations in parallel.

FIG. 5 depicts an example concept diagram of selected components of a translation lookaside buffer coherency unit with Emulated Purge to handle multiple MP-coherency operations in parallel. FIG. 5 includes a TCUEP 500, similar to the TCUEP 200 as described above with reference to FIG. 2. However the TCUEP 500 includes a QTagC register 502 which is multi-bit wide (e.g., two bit wide), and a QTag storage unit 505 (not depicted in FIG. 2). The TCUEP 500 includes an MMU 508 having translation blocking units 510 and 512, a TLB 513 having emulated purge units 516 and 518, and a TLB 520 having emulated purge units 522 and 524. The TCUEP 500 also includes a QTagT register 504, an instruction fetch unit 506, an out-of-order execution unit 514. For simplification, FIG. 5 does not include all components of the TCUEP 500 (e.g., an instruction address register, an operand address register etc.). The operations performed by components of the TCUEP 500 are similar to the operations performed by components of the TCUEP 200, except that two translation blocking units (510 and 512), two emulated purge units (516 and 518) in the TLB 513, and two emulated purge units (522 and 524) in the TLB 520 are capable of handling two MP-coherency operations in parallel. Each of the emulated purge units 516, 518, 522 and 524 also maintain a separate rigid marker for each TLB entry. The emulated purge units 516 and 522 receive a first global enable emulated purge signal. The emulated purge units 518 and 524 receive a second global enable emulated purge signal.

A microprocessor increments the multi-bit wide QTagC register 502 every time an MP-coherency operation is received. At the next interruptible point, after receiving the MP-coherency operation, the microprocessor copies the value of the QTagC register 502 to the QTagT register 504. The instruction fetch unit 506 while fetching an instruction attaches the value present in the QTagT register 504 as QTagI to the instruction. The emulated purge units 516 and 522, and similarly the emulated purge units 518, and 524 do not utilize the value in the QTagC register 502 for comparison with QTagI (attached with an instruction) to determine whether to enable Emulated Purge. Also, the translation blocking units 510 and 512 do not utilize the value in QTagC register 502 for comparisons. For each MP-coherency operation, the value of QTagC register 502 incremented on receiving the MP-coherency operation is copied and saved separately for comparison with the QTagI. For example, the microprocessor can store the multiple values of QTagC in the QTag storage unit 505. The emulated purge units 516, 522, and the translation blocking unit 510 utilize TLB purge information corresponding to a first MP-coherency operation. The emulated purge units 516 and 522 determine whether to enable Emulated Purge based on a comparison of the QTagC (corresponding to the first MP-coherency operation, received from the QTag storage unit 505) with the QTagI attached with an instruction, and the first global enable emulated purge signal. Also, the translation blocking unit 510 determines whether to block storage access based on the QTagC value corresponding to the first MP-coherency operation and rigid markers maintained by the emulated purge units 516 and 522. Similar operations are performed by the translation blocking unit 512, and the emulated purge units 518 and 524 for the second MP-coherency operation. The components of the TCUEP 500 can handle the two MP-coherency operations in parallel independent of each other.

It is noted that the QTagC register 502 is multi-bit wide, however the width is finite. In some embodiments, after certain increments the value in the QTagC register 502 may wrap (i.e., the counter may restart), and hence the value after increment may be less than the intended value. In order to avoid wrapping, the value in QTagC register 502 may be allowed to wrap, but the value is corrected before it is utilized for any comparison. In one implementation, a single bit in the QTagC register 502 (e.g., the MSB) may be utilized for applying correction (e.g., by using the MSB as a flip bit). Utilizing the MSB for correction purpose divides the QTagC value range into two halves, an upper half range and a lower half range. Using the flip bit, the upper half range and the lower half range may can be swapped before the timestamp value in the QTagC register is utilized. When allowing the swap between the upper half range and the lower half range it is ensured that all values from one of the halves is not in use (i.e., no MP-coherency operation for those values is pending). For pipelined MP-coherency operations (i.e., multiple MP-coherency operations from multiple MP-coherency initiators utilizing a single MP-coherency manager) which are answered in sequence, a buffer full signal may be utilized to indicate to other MP-coherency initiators in the MP system that the QTagC register 502 is blocked from increment. The buffer full signal indicates to the other MP-coherency not to send an MP-coherency operation as long as the buffer full signal is set. In some embodiments, the buffer full signal may be set ahead of time (e.g., with few possible increments remaining) to take into account any delays.

It is noted that the TCUEP 500 in FIG. 5 is not limited to handling two MP-coherency operations in parallel. With multiple translation blocking units, and emulated purge units in the TLB hierarchy along with an increased width of the QTag registers (i.e., the QTagC register 502 and the QTagT register 504), the TCUEP 500 can handle multiple number of MP-coherency operations in parallel.

It is noted that, when a microprocessor is initiator of an MP-coherency operation, it does not utilize Emulated Purge or the translation blocking technique. After sending the MP-coherency operation, the microprocessor (i.e., the MP-coherency initiator) waits for an answer(s) from the microprocessor(s) (e.g., an MP-coherency manager) in the MP system. When the microprocessor(s) in the MP system have answered the MP-coherency operation, the MP-coherency initiator writes the new table entry(ies) and finishes the MP-coherency operation. In some implementations, the microprocessor (i.e., the MP-coherency initiator) starts a TLB purge operation by receiving and answering its own MP-coherency operation. The microprocessor does not increment its QTagC, however it can start the TLB purge operation and send an answer signal for its own MP-coherency operation.

It is also noted that, when an instruction encounters an exception, a microprocessor does not execute instructions following that instruction (i.e., the instruction with the exception). The microprocessor executes an exception handler. In one implementation, the microprocessor considers execution of old instructions is complete and considers the MP-coherency operation is observed. It is noted that, with out-of-order processing some instructions preceding the instruction with the exception may not be complete, the microprocessor completes execution of the preceding instructions before the completion of old instructions (i.e., instructions present before the MP-coherency operation). On completion of the old instructions, the microprocessor can instruct a MMU to start a TLB purge operation and send an answer to the MP-coherency operation. When the instruction with the exception repeats (e.g., a page-fault exception), the microprocessor executes the instruction (i.e., the instruction with exception) as the MP-coherency operation is observed. The microprocessor repeats the instruction fetch for the instruction and re-tags the instruction with an instruction QTag. The instruction's address and operand addresses are subject to hit-suppression and translation blocking.

It is also noted that, a microprocessor goes through a recovery on detecting an internal fault. The microprocessor resets the logic (e.g., clears the TLBs) in a TCUEP and considers an MP-coherency operation as observed. An error correction code checks the (milli-) architected state for faults and if possible corrects the fault. The microprocessor repeats the oldest not-completed instruction (continued from the (milli-)architected state). The logic external to the microprocessor unit detects a recovery and automatically reports the microprocessor as having observed the MP-coherency operation. After the recovery, the microprocessor starts at the last (milli-)architected state. The microprocessor resets one or more QTagC and QTagT registers, and starts a TLB purge operation. No instructions are in flight, no QTagIs are used and the emulated purge is disabled. The translation blocking technique is in effect for translations after the recovery as long as one or more MP-coherency operations are in progress. For example, after the recovery, the microprocessor may detect that an MP-coherency operation is in progress. However, the microprocessor may not be able to determine that the MP-coherency operation is the same as prior to the recovery, a new MP-coherency operation, or whether multiple MP-coherency operations have occurred during the recovery. Hence, the translation blocking technique (utilizing unconditional blocking) is in effect as long as one or more MP-coherency operations are in progress.

The TCUEP described in the embodiments can handle SMT. The TCUEP recognizes each thread as a separate logical core. The TCUEP includes a QTagT register per MP-coherency manager for each thread. A microprocessor updates the QTagT register independently for each thread. Each of the instructions holds a single QTagI value, based on the QTagT register of the respective thread. In some embodiments, when an MP-coherency operation is common for all threads, the TCUEP utilizes a single QTagC register i.e., additional QTagC registers are not utilized for receiving the MP-coherency operation.

Multiple threads can share a TLB using different implementations (e.g., a Shared TLB implementation and a Shared Entry TLB implementation). In the Shared TLB implementation, the TLB includes TLB entries that are private to each thread. A thread can purge its private TLB entries independently. The multiple threads share the TLB capacity (i.e., total number of TLB entries). New TLB entries formed by one thread can age-out entries from other threads (e.g., based on Least Recently Used (LRU) algorithm).

In the Shared Entry TLB implementation, the multiple threads can share a TLB entry (created by one of the multiple threads) based on certain conditions (e.g., same configuration, same address space, etc.). A thread cannot purge a TLB entry shared with other thread(s) until the other thread(s) have reached an interruptible point time. For example, if a first thread purges a TLB entry shared with a second thread. The second thread may write to the TLB entry again and the first thread may wrongly use the TLB entry. To avoid this problem, a thread sends a ready-to-purge signal on completing the execution of old instructions but does not yet start the purge. Also, an MP-coherency manager in the MP system may not be aware of SMT inside a core. The MP-coherency manager sends a single MP-coherency operation to the core, and receives a single answer for the MP-coherency operation. For example, once a thread has reached its interruptible point for an MP-coherency operation, it starts parallel execution of old and new instructions. On completing the execution of the old instructions, instead of purging a TLB entry that is shared, the thread sends the ready-to-purge signal to an MP-coherency operation observed collector. The MP-coherency operation is not answered (i.e., the ready-to-purge signal stays inside the microprocessor core) while the thread continues to execute new instructions with Emulated Purge and the translation blocking technique in effect. The thread can write to the TLB entry and mark the TLB entry with a rigid marker. When all threads which share TLB entries have sent the ready-to-purge signal, the microprocessor can purge the TLB and send an answer to the MP-coherency manager for the MP-coherency operation.

If a recovery occurs during the execution of multiple threads, the microprocessor core goes through recovery and all threads restart at the last known good architected state, having observed the MP-coherency operation. In some embodiments, certain threads having observed the MP-coherency operation and other threads not having observed the MP-coherency operation when recovery occurs, does not affect sharing of the TLB entries by the multiple threads. Also, an exception in one thread between its ready-to-purge signal and the actual purge, does not affect sharing of the TLB entries by multiple threads. The microprocessor core executes multiple threads while Emulated Purge and the translation blocking technique are enabled until the TLB purge operation is started. Otherwise same rules apply as described in the single threaded description.

The TCUEP described in the embodiments above also includes support for multiple MP-coherency managers (one MP-coherency initiator per MP-coherency manager) in parallel. To support multiple MP-coherency initiators, the TCUEP includes a separate QTagC register for each MP-coherency manager. The TCUEP includes the registers as $QTagC_i$, where i represents number of an MP-coherency manager. The TCUEP also maintains a purged view and a non-purged view of TLBs/MMU for each MP-coherency operation. Instructions hold multiple QTagIs, with a $QTagI_i$ for each MP-coherency manager. The emulated purge unit 213 of FIG. 3 depicts comparators 310, 311, 312 and 314 for a single MP-coherency initiator. The TCUEP includes separate comparators for each MP-coherency manager to support multiple MP-coherency initiators. Also, the TCUEP includes multiple instances of the logical AND gates 313, 315, 317, 319, 316, 318, and 320 for each of the MP-coherency initiators. Each of the multiple instances of the logical AND gate 313 receives a separate global enable emulated purge signal corresponding to the respective MP-coherency initiator. The number of inputs to logical AND gates 322, 324 and 326 is equal to the number of MP-coherency initiators+1. The TLBs also include a rigid marker per MP-coherency manager for a TLB entry and the rigid marker is reset separately for each of the MP-coherency manager. The multiple MP-coherency initiators can initiate multiple MP-coherency operations in parallel which are independent of each other (using different MP-coherency managers). Hence, an MP-coherency operation can finish before a previously initiated MP-coherency operation. The flow diagram of FIG. 4 illustrates operations performed for a single MP-coherency initiator. Similar operations are performed for each MP-coherency initiator.

When multiple MP-coherency operations are present in the system at the same time (controlled by multiple MP-coherency managers), deadlocks may occur. When, a processor is an MP-coherency initiator, it may also be a receiver of an MP-coherency operation from another MP-coherency initiator. A deadlock can occur when the MP-coherency operation on one receiving MP-coherency initiator stops the MP-coherency operation initiated by the other MP-coherency initiator, a deadlock occurs. For example, Processor A initiates an MP-coherency operation and around the same time processor B also initiates another MP-coherency operation. After both processors (i.e., Processor A and Processor B) begin executing the instruction that initiates the MP-coherency operation, the processor is not interruptible. Processor A receives the MP-coherency operation initiated by Processor B, and Processor B receives the MP-coherency operation initiated by Processor A. Processor B waits to answer Processor A's MP-coherency operation until it receives an answer to its own MP-coherency operation from Processor A, and vice versa. To resolve such deadlocks, an MP-coherency operation observable point ensures that the MP-coherency initiators answer their received MP-coherency operations independently instead of waiting for an interruptible point. For example, Processor A initiates a first MP-coherency operation, and Processor B initiates a second MP-coherency operation. Processor A copies the QTagC value of the second MP-coherency operation to its QTagT register, and hence performs the second MP-coherency operation. Similarly, Processor B copies the QTagC value of the first MP-coherency operation to its QtagT register, and performs the second MP-coherency operation.

The TCUEP described in the embodiments above also includes support for multiple MP-coherency operations per MP-coherency manager from different MP-coherency initiators. It is noted that multiple MP-coherency operations using the same MP-coherency manager are answered in the order they are received (i.e., pipelined). To support multiple MP-coherency operations, each MP-coherency operation utilizes separate comparators for Emulated Purge at TLBs which can be enabled or disabled individually. Each MP-coherency operation has its own purged and non-purged view on every TLB. Each MP-coherency operation holds a copy of the QTagC value when it was received and after the QTagC has been incremented. Each instruction has one QTagI, however the width of QTagI is increased based on the number of MP-coherency operations. The number of comparisons for old and new instructions is also increased. For example, an instruction can be older than a first MP-coherency operation or the instruction can be newer than the first MP-coherency operation but older than a second MP-coherency operation, etc. The answer to an MP-coherency operation can be sent when no value smaller than QTagC (i.e., the copy of QTagC corresponding to the respective MP-coherency operation) is no longer utilized by an active instruction (i.e., an instruction in-flight) in the processor. The TLBs also include as many separate rigid markers for a TLB entry as there are pipelined MP-coherency operations possible and the rigid marker is reset separately for each of the MP-coherency operations.

It is noted that the TCUEP described above is also capable of supporting Multiple MP-coherency operations per MP-coherency manager for multiple MP-coherency managers (i.e., pipelined MP-coherency operations for each MP-coherency manager along with MP-coherency operations received from multiple MP-coherency initiators in parallel).

It is noted that the TCUEP described above is also capable of supporting Multiple MP-coherency operations per MP-coherency initiator utilizing the same or different MP-coherency managers (e.g. more than one thread in SMT processor initiate a MP-coherency operation in parallel).

Although, the embodiments described in FIGS. 1-3 include QTags with a limit on the width (i.e., single-bit wide), embodiments are not so limited. In other embodiments, the QTags may be multi-bit wide with a fixed width, with no limit on the width, etc. For multi-bit wide QTags, the TCUEP includes additional circuitry to prevent wrapping of the QTags after certain number of increments to the QTags (as described above). With no limit on the width, the QTags are not prone to wrapping (i.e., reset after certain increments).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
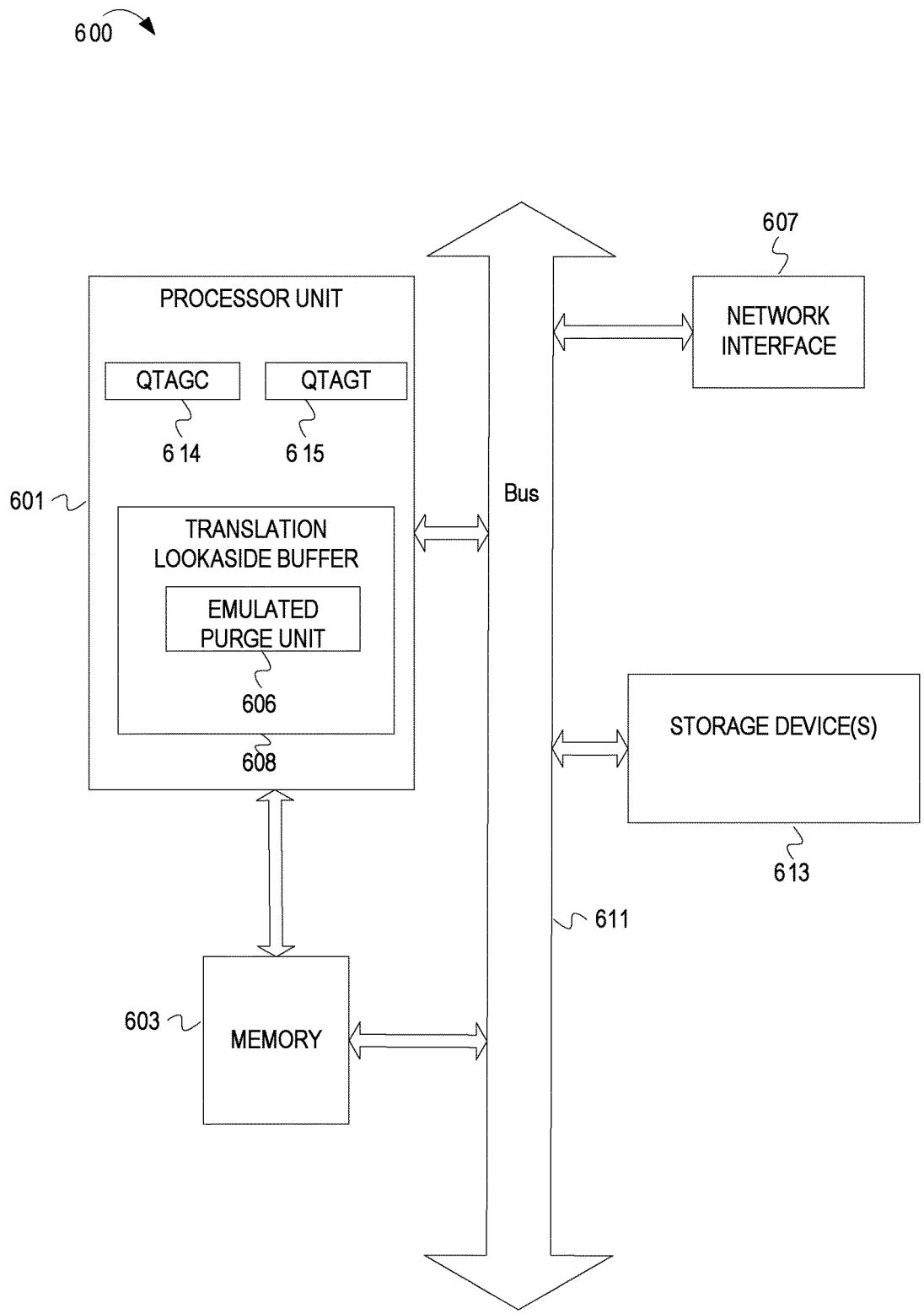
FIG. 6 depicts an example computer system.

FIG. 6 depicts an example computer system 600. The example computer system 600 includes a processor unit 601 (possibly including multiple processors, multiple cores, multiple nodes, and/or implementing multi-threading, etc.). The computer system includes memory 603. The memory 603 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 611 (e.g., PCI, ISA, PCI-Express, HyperTransport®, InfiniBand®, NuBus, etc.), a network interface 607 (e.g., an ATM interface, an Ethernet interface, a Frame Relay interface, SONET interface, wireless interface, etc.), and a storage device(s) 613 (e.g., optical storage, magnetic storage, etc.). The processor unit 601 includes a QTagT register 615, a QTagC register 614, and a translation lookaside buffer 608 having an emulated purge unit 606. The QTagC register 614 is keeps a track of received MP-coherency operations. The QTagT register 615 is the source of instruction QTags (i.e., QTagIs). The emulated purge unit 606 embodies the functionality to implement some of the embodiments described above. The emulated purge unit 606 implements Emulated Purge and other functionalities supported by the TCUEP. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 613, and the network interface 607 are coupled to the bus 611. Although illustrated as being coupled to the bus 611, the memory 603 may be coupled to the processor unit 601.

While the embodiments are described with reference to various implementations and exploitations, it will be understood that these embodiments are illustrative and that the scope of the inventive subject matter is not limited to them. In general, techniques for implementing Emulated Purge and selectively suppressing hits for certain instructions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for managing address translations in a multi-processor computer system, the method comprising:
   in response to detecting a hit in a translation lookaside buffer of a processor unit for a virtual address corresponding to an instruction,
   determining whether an entry corresponding to the hit will be purged from the translation lookaside buffer based, at least in part, on an indication of a change to a page table,
   determining whether the instruction entered an instruction pipeline of the processor unit after the processor unit received the indication of the change to the page table,
   allowing the hit in the translation lookaside buffer in response to determining that the instruction entered a pipeline before the processor unit received the indication of the change to the page table,
   suppressing the hit in the translation lookaside buffer, by forming new translation lookaside buffer entries in response to determining that the instruction entered the pipeline after the processor unit received the indication of the change to the page table, where in the new translation lookaside buffer entries are formed without purging the translation lookaside buffer, and
   after suppressing the hit, blocking translation in the page table for address translation of the virtual address corresponding to the instruction from the virtual address into a physical address in response to determining that the entry will be purged based, at least in part, on the indication of the change to the page table.

2. The method of claim 1, further comprising:
   after suppressing the hit, allowing translation in the page table for address translation of the virtual address corresponding to the instruction from the virtual address into a physical address in response to determining that the entry will not be purged based, at least in part, on the indication of the change to the page table.

3. The method of claim 1 further comprising marking the entry as to be purged in response to a determination that the entry corresponding to the hit will be purged.

4. The method of claim 1, further comprising:
   updating a first register in response to the indication of the change to the page table; and
   after the updating to the first register, copying the content of the first register to the second register at an interruptible point subsequent to receipt of the indication of the change to the page table.

5. The method of claim 4 further comprising associating a tag with each instruction that enters the instruction pipeline of the processor unit, wherein the tag is based on content of the second register.

6. The method of claim 4, wherein said determining whether the instruction entered the instruction pipeline of the processor unit after the processor unit received the indication of the change to the page table comprises comparing a tag of the instruction with the first register.

7. A non-transitory computer program product for managing address translations in a multi-processor computer system, the computer program product comprising:
   a computer readable storage medium having computer usable program code embodied therewith, the computer usable program code comprising a computer usable program code configured to,
   in response to detecting a hit in a translation lookaside buffer of a processor unit for a virtual address corresponding to an instruction,
   determine whether an entry corresponding to the hit will be purged from the translation lookaside buffer based, at least in part, on an indication of a change to a page table of the multi-processor computer system,
   determine whether the instruction entered an instruction pipeline of the processor unit after the processor unit received the indication of the change to the page table,
   allow the hit in the translation lookaside buffer in response to determining that the instruction entered a pipeline before the processor unit received the indication of the change to the page table, suppress the hit in the translation lookaside buffer, by forming new translation lookaside buffer entries, in response to determining that the instruction entered the pipeline after the processor unit received the indication of the change to the page table, wherein the new translation lookaside buffer entries are formed without purging the translation lookaside buffer, and after suppression of the hit, block translation in the page table for address translation of the virtual address corresponding to the instruction from the virtual address into a physical address in response to determining that the entry will be purged based, at least in part, on the indication of the change to the page table.

8. The non-transitory computer program product of claim 7, wherein the computer usable program code further comprises computer usable program code to:

after suppression of the hit, allow translation in the page table for address translation of the virtual address corresponding to the instruction from the virtual address into a physical address in response to determining that the entry will not be purged based, at least in part, on the indication of the change to the page table.

9. The non-transitory computer program product of claim 7, wherein the computer usable program code further comprises computer usable program code to mark the entry as to be purged in response to a determination that the entry corresponding to the hit will be purged.

10. The non-transitory computer program product of claim 7, wherein the computer usable program code further comprises computer usable program code to:

update a first register in response to the indication of the change to the page table; and copy the content of the first register to the second register at an interruptible point subsequent to receipt of the indication of the change to the page table.

11. The non-transitory computer program product of claim 10, wherein the computer usable program code further comprises computer usable program code to associate a tag with each instruction that enters the instruction pipeline of the processor unit, wherein the tag is based on content of the second register.

12. The non-transitory computer program product of claim 10, wherein the computer usable program code to determine whether the instruction entered the instruction pipeline of the processor unit after the processor unit received the indication of the change to the page table comprises computer usable program code to compare a tag of the instruction with the first register.

13. An apparatus comprising:
a processor unit; and
a memory coupled with the processor unit, the memory configured to host a page table;

wherein the processor unit is configured to:
in response to detecting a hit in a translation lookaside buffer of the processor unit for a virtual address corresponding to an instruction,
determine whether an entry corresponding to the hit will be purged from the translation lookaside buffer based, at least in part, on an indication of a change to the page table,
determine whether the instruction entered an instruction pipeline of the processor unit after the processor unit received the indication of the change to the page table,
allow the hit in the translation lookaside buffer in response to determining that the instruction entered a pipeline before the processor unit received the indication of the change to the page table;
suppress the hit in the translation lookaside buffer by formation of new translation lookaside buffer entries in response to determining that the instruction entered the pipeline after the processor unit received the indication of the change to the page table, wherein the new translation lookaside buffer entries are formed without purging the translation lookaside buffer, and
after suppression of the hit, block translation in the page table for address translation of the virtual address corresponding to the instruction from the virtual address into a physical address in response to determining that the entry will be purged based, at least in part, on the indication of the change to the page table.

14. The apparatus of claim 13, wherein the processor unit is further configured to, after suppression of the hit, allow translation in the page table for address translation of the virtual address corresponding to the instruction from the virtual address into a physical address in response to determining that the entry will not be purged based, at least in part, on the indication of the change to the page table.

15. The apparatus of claim 13, wherein the processor unit is further configured to mark the entry as to be purged in response to a determination that the entry corresponding to the hit will be purged.

16. The apparatus of claim 13, wherein the processor unit is further configured to:
update a first register in response to the indication of the change to the page table; and
copy the content of the first register to the second register at an interruptible point subsequent to receipt of the indication of the change to the page table.

17. The apparatus of claim 16, wherein the processor unit is further configured to associate a tag with each instruction that enters the instruction pipeline of the processor unit, wherein the tag is based on content of the second register.

18. The apparatus of claim 16, wherein the processor unit is further configured to compare a tag of the instruction with the first register.

* * * * *